Oct. 4, 1966           H. O. EGLI           3,276,132

GAGE BLOCK ASSEMBLY FASTENING ARRANGEMENT

Filed June 3, 1963           3 Sheets-Sheet 1

INVENTOR.
HENRY O. EGLI

BY

OSTROLENK, FABER, GERB & SOFFEN
ATTORNEYS

INVENTOR.
HENRY O. EGLI
BY
OSTROLENK, FABER, GERB & SOFFEN
ATTORNEYS

Oct. 4, 1966   H. O. EGLI   3,276,132
GAGE BLOCK ASSEMBLY FASTENING ARRANGEMENT
Filed June 3, 1963   3 Sheets-Sheet 3

INVENTOR.
HENRY O. EGLI
BY
OSTROLENK, FABER, GERB & SOFFEN
ATTORNEYS

United States Patent Office 3,276,132
Patented Oct. 4, 1966

3,276,132
GAGE BLOCK ASSEMBLY FASTENING
ARRANGEMENT
Henry O. Egli, Riverside Drive, Sidney, N.Y.
Filed June 3, 1963, Ser. No. 284,891
20 Claims. (Cl. 33—168)

My invention relates to a novel arrangement for securably fastening a plurality of gage blocks, which is a continuation-in-part of an arrangement set forth in my co-pending U.S. patent application Serial No. 100,671 filed April 4, 1961, and entitled, "Gage Block Assembly Fastening Devices," now U.S. Patent No. 3,162,955. More particularly, the gage block assembly of the instant invention preferably limits the compressive fastening stresses to relatively short abutting regions of the adjacent gage block surfaces, thereby maintaining increased dimensional integrity of the overall assembly.

The necessity for precision machined parts requires corresponding accuracy in the gaging tools used, with the precision of the product being ultimately limited by the calibrated precision of the measuring apparatus. It is known to calibrate the great variety of gaging tools now employed in industry against standard dimensions provided by a fastened assembly of individual gage block members. More particularly, because of the unlimited variety of calibrated dimensions to be provided, it has become the practice to employ accurately calibrated gage blocks of standard dimensions with a plurality of such gage blocks being interconnected to combinedly provide the desired dimensions for each particular purpose. Further, such individual gage blocks of relatively short length can be produced to a greater accuracy than elongated gage blocks of various non-standard dimensions. In order to maintain high precision in the overall dimension of such a fastened array, it is necessary to maintain extreme mating accuracy at the fastened surfaces, while insuring parallelism of the overall structure. Any variation in dimension provided at the abutting surfaces of adjacent gage blocks will disadvantageously effect the overall accuracy, with such inaccuracy being increased as the number of individual gage blocks of the overall assembly increases.

One method which has been practiced to assemble such gage blocks is known as wringing, wherein a wetting agent such as kerosene or silicone oil, provides a thin film intermediate the abutting surfaces of adjacent gage blocks causing such surfaces to adhere. This technique suffers from numerous disadvantages; namely, the thickness of the wetting agent intermediate the gage block has been shown to be subject to considerable dimensional variation, thereby adversely effecting the dimensional accuracy of the overall assembly; the rubbing together of the gage blocks, and particularly the engagement of the corners thereof or the action of abrasive particles contained within the wringing film, tends to damage the abutting gaging surfaces; and the wring joint will be separated when subjected to moderate shock, particularly as the length of the assembly and number of individual blocks increases.

Another arrangement which has been practiced is to either place an external frame about the gage block assembly or a tie rod through aligned central apertures of the gage block, and compressively tighten the entire assembly. This arrangement disadvantageously provides considerable bending motions, causing lateral deflection of the elongated gage block assembly, such that gage blocks clamped in this manner provide significant erros resulting from loss of parrallelim and dimensional change. Further, placing the entire assembly under compressive stresses can result in considerable deformation thereof, as for example it can be shown that 10 inch pounds of torque applied to a 10 inch long gage block assembly of "Hoke" or U.S. square cross section effects 0.001" of compressive shortening, with such a torque magnitude being quite easily applied with a conventional screw driver.

Some of the above problems have been avoided in the hermaphrodite bolt arrangement described in my previous Patent No. 2,766,531 issued October 16, 1956, and the improvement thereof described and claimed in above-mentioned U.S. Patent No. 3,162,955, whereby individual fastening members extending throughout each of the gage blocks of the overall assembly are provided. However, this method still disadvantageously places the entire gage block length under compressive stresses, thereby permitting substantial dimensional variation thereof.

My invention, which is a continuation-in-part of above-mentioned U.S. Patent No. 3,162,955, advantageously solves these problems by limiting the placement of the fastening members to relatively short abutting regions of the adjacent gage block surfaces, and controlling the applied compressive stresses. Accordingly, I have found by so limiting the region of the gage block under compressive stress, the dimensional deviation resulting therefrom is substantially reduced and may be controllably limited to greatly enhance the dimensional integrity of the overall assembly.

Basically, the fastening device of my invention comprises cooperating first and second members being respectively supported at the abutting surfaces to be fastened. In one embodiment of my invention, one of the members is a bolt, the head thereof being supported by an internal shoulder at the end region of one of the gage block surfaces to be fastened, and the forward end projecting into the adjacent gage block; the mating surface of the adjacent gage block having a threaded insert member, such that the threaded engagement of said members securably fastens the adjacent gage blocks at their abutting surfaces.

As a particularly advantageous aspect of my invention, the compressive engagement of fatening members is predeterminedly controlled to provide sufficient compressive stress at the abutting gage block surfaces to rupture an intermediate air film formed therebetween. More particularly, I have found that providing a compressive stress of at least in the order of 100 p.s.i. is sufficient to insure a clean and dry intimate contact between the adjacent abutting gage block surfaces.

As a further advantageous aspect, the fastening assembly is resiliently constructed to provide temperature compensation to maintain the compressive or clamping forces upon temperature equalization. Such compensation may be provided by under-cutting the fastening bolt or the inclusion of a resilient washer formed of nylon or other suitable resilient material intermediate the bolt and its supporting shoulder.

As another advantageous aspect of my invention, it has been found that when a series of gage blocks are assembled as described, the end thereof containing the threaded insert will have substantially a net zero deformation; that is, the tensile force at the threaded insert region will be equal to an opposite to the compressive forces thereabout. Further, the region at the other end of the gage block, intermediate the bolt supporting internal shoulder of the gage block and its abutting surface, subjected to the compressive stress, is a rather short region, which region may for example equal 0.19" for all sizes of gage blocks encountered. This is to be compared to the above-discussed previous arrangements, wherein the entire length of gage block is under compressive strength. Since the dimensional variation effected by compressive stress in such prior arrangements is proportional to the length of gage block under compression, my invention substantially reduces such dimensional changes, inasmuch as only a rather short region of gage block length will be subject to such dimensional variation for all lengths of gage blocks. As, for example, five 2″ gage blocks assembled in accordance with the teachings of my invention will be subjected to an overall compressive variation of $10 \times 10^{-6}″$, as contrasted to a compressive variation of $100 \times 10^{-6}″$ for a similar arrangement assembled in accordance with the prior art, wherein the entire length is subjected to compressive forces. Further, I have found out that the improved fastening technique of my invention tends to average out minor variations in surface flatness, and accordingly has provided overall dimensional accuracy of even greater precision than theoretically expected.

As an additional advantageous aspect of my invention, the fastening assembly, such as the bolt and threaded insert of the embodiment described above, may be identically constructed for use in conjunction with various lengths of gage blocks; that is, the manner in which such fasteners interconnect with gage blocks of various lengths will be identical, such that gage blocks of various lengths will have the same area thereof subject to compressive stresses. Accordingly, by controllably equalizing the fastening stresses at all such fastened surfaces, the compressive deformation of each gage block will be identical, permitting compensation thereof in the original manufacture of the gage block by increasing the positive tolerance and reducing the negative tolerance for the gage block. Further, the identity of parts preferably avoids the need for fabricating and stocking various length fasteners.

As still a further advantageous aspect of my invention, the non-wringing of the blocks prevents scouring or other damage of the gaging surfaces, to provide a much longer gage life than theretofore available. Further, the gage blocks may now be made from a material having the same coefficient of thermal expansion as the product being measured, thereby compensating for variations in ambient shop temperature.

An alternative fastening arrangement embodying the basic concept of my invention may be effected by forming the first member of an expandable assembly, having a broadened head surface supported by an internal shoulder at one of the gage block end surfaces; the forward end of said expandable assembly projecting into the adjacent gage block and having a shoe in cam follower engagement with a snap-ring cam surface supported by the adjacent gage block. The head and forward shoe portions of the expandable assembly are interconnected by a spring, such that the cam engaged rotation of the shoe along the snap ring will expand the spring a predetermined amount to provide the aforesaid compressive strength intermediate the abutting gage block surfaces to insure secure, accurate fastening.

Accordingly, it is seen that the basic concept of my invention resides in an improved fastening arrangement for gage block assemblies, wherein the compressive fastening stresses are limited to the abutting regions of the adjacent gage block surfaces, with such fastening being effected with a predetermined compressive strength sufficient to rupture the intermediate air film, thereby providing increased dimensioned integrity of the overall gage block assembly.

Accordingly, it is a primary object of my invention to provide a novel gage block fastening arrangement for assembling a plurality of individual gage block members.

A further object of my invention is to provide a fastening arrangement for assembling individual gage blocks, wherein the compressive forces are limited to the abutting regions of adjacent ones of said gage blocks.

Another object of my invention is to provide such a gage block fastening arrangement wherein a predetermined force is applied at the abutting adjacent surfaces to provide a sufficient compressive strength to rupture an intermediate air film, thereby providing a clean, dry intimate contact relationship.

An additional object of my invention is to provide for the interconnection of adjacent gage blocks, wherein one of said gage blocks supports a bolt at the end thereof to engage a threaded insert supported at the adjacent end of the other gage block, whereby the compressive stresses during fastening thereof are limited to such abutting regions of the gage blocks.

Still a further object of my invention is to provide such a gage block assembly arrangement wherein the bolt is constructed to resiliently maintain uniform clamping forces even though fasteners and gage blocks are at different temperatures at time of assembly.

Still another object of my invention is to provide such a gage block fastening arrangement, wherein gage blocks of varying overall length may be fastened with identical fastening means, with the regions of such gage blocks under compressive stress being identical.

Yet a further object of my invention is to provide a gage block having a central bore longitudinally extending therethrough, with the internal dimensions of the central bore being varied at the end regions thereof to form internal support regions adapted to support fastening means, with the length of gage block intermediate said support regions and their respective end surfaces being considerably less than the overall length of the gage block.

Yet another object of my invention is to provide such a gage block wherein the support regions are constructed to provide internal support shoulders, one supporting the head of a bolt, and the other supporting a threaded insert adapted to mate with the threaded end of a similar bolt.

These as well as other objects of my invention will readily become apparent upon a consideration of the following drawings in which.

Figure 1:
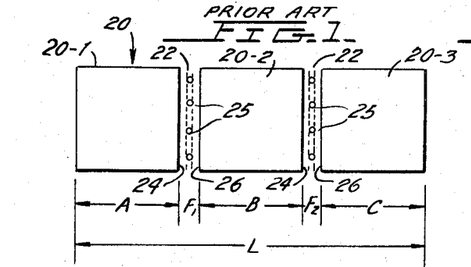
FIGURE 1 shows a first typical prior art fastening arrangement of a gage block assembly.

Referring first to the prior art wringing technique shown in FIGURES 1 and 2, the assembly 20 of individual gage blocks 20–1, 20–2, and 20–3 of lengths, A, B, C, respectively, are shown fastened together by a thin film 22 of a wetting agent, such as kerosene or silicone oil, the thin film 22 causing the adjacent smooth surfaces 24, 26 to adhere together. Since the adjacent abutting gage block surfaces 24, 26 are stand-off separated by the actual thickness F and $F_2$, of the wringing film (shown exaggerated), the overall length L of the assembly shown in FIGURE 1 will be given by:

(1) $\qquad L = A + B + C + F_1 + F_2$

Accordingly, should the film thickness $F_1$ or $F_2$ vary from an exact predetermined value, the accuracy of the overall length of the gage block assembly will be similarly effected. Further, extensive studies by scientists at the U.S. National Bureau of Standards have indicated that the film thickness does vary considerably and may run as high as 2.8 millionths of an inch. Although this value may oftentimes be maintained under 2.8 millionths of an inch under strict laboratory conditions, gage blocks are oftentimes assembled at other than such conditions with there being dust particles 25 entrapped in the wringing film. That is, the film 22 thickness is sufficient to contain dust particles 25 while still providing adhesion between the gage block surfaces 24, 26, thereby increasing the propensity of appreciable stand-off between gage block surfaces assembled by a wringing process. Further, wrung gage block assemblies fall apart with relative ease, particularly when assembled to appreciable lengths. Hence, such assemblies are oftentimes made at the actual work-place, further increasing the probability of there being dust particles, such as 25, entrapped within the wringing film to adversely effect the dimensional integrity of the overall assembly.

Figure 2A:
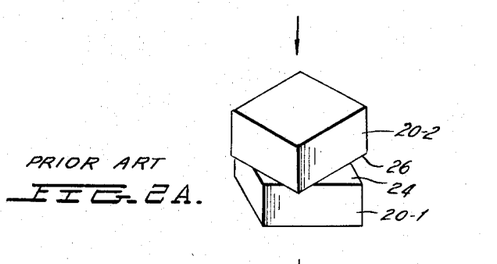
FIGURES 2A-2D sequentially show the manner in which individual ones of the gage blocks are fastened together in the manner shown in FIGURE 1.
Figure 2B:
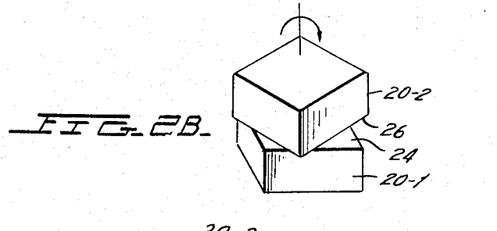
Figure 2C:
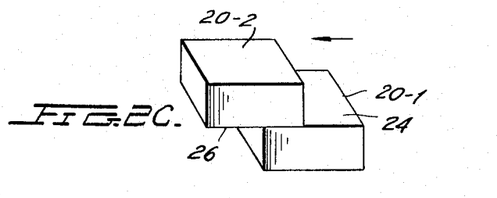
Figure 2D:
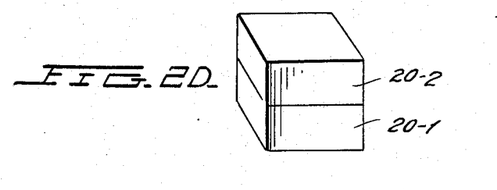

A further disadvantageous aspect of the wrung block assembly results from the propensity for scouring or scratching the accurately machined engaged block surfaces 24–26 during the wringing process. Referring to FIGURES 2A–2D, the blocks such as 20–1, 20–2 are first obliquely set together as shown in FIGURE 2A. Should the corners of the gage blocks be bumped together during this first step of the wringing process, the damage caused therey will effect the accuracy of measurement. The blocks are then rotated, while being pressed together from their position shown in FIGURE 2A to their parallel juxtaposed position shown in FIGURE 2C, with block 20–2 being slid along the surface of block 20–1 to the final position shown in FIGURE 2D. Hence, any bruises or sharp scratches previously formed within the adjacent gage block surfaces 24, 26 in conjunction with abrasive particles, such as 25, contained within the wringing film 22, coact as cutting edges during the wringing process, thereby effecting the accuracy of the overall block assembly. Accordingly, it is seen that a wrung block assembly is considerably less than completely desirable with respect to accuracy of measurement, gage block life and obtaining impact resistance fastening of the assembled gage block members.

Figure 3A:
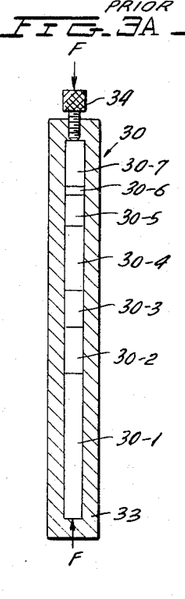
FIGURES 3A and 3B show other prior art arrangements of assembling a plurality of individual gage blocks.
Figure 3B:
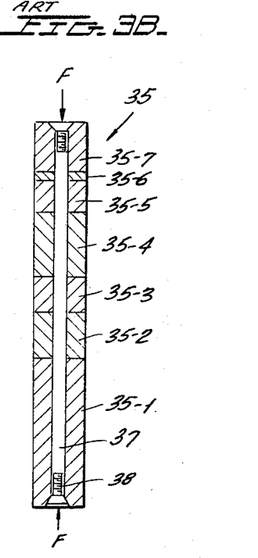
Figure 4:
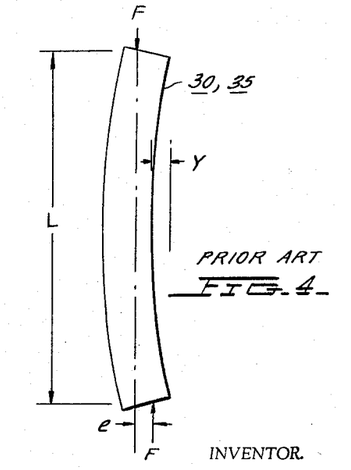
FIGURE 4 is an exaggerated diagram showing the loss of parallelism and change in dimension resulting from the gage block assembly arrangement of FIGURES 3A and 3B.

FIGURES 3A and 3B illustrate other prior art arrangements of fastening the gage block assemblies, with FIGURE 3A showing a frame holder and 3B a tie rod arrangement. Referring first to FIGURE 3A, the individual gage block members 30–1—30–7 are contained within a conventional frame holder 33 to combinedly form the desired dimension. The total length of gage blocks is compressively secured by knurled fastening member 34. Tie rod assembly 35 of FIGURE 3B similarly shows individual "Hoke" block members 35–1—35–7, secured by centrally located tie-rod member 37, with the end blocks 35–1, 35–6 having a suitable configuration to support the heads of tightening bolts 38. Assemblies 30, 35 may both be considered as a solid column under unrestrained axial forces at its end points, as shown by arrows F. Referring to FIGURE 4, which shows the column action effect thereof in exaggerated form, it is seen that the application of forces F along the opposite ends of the elongated column 30 or 35, comprised of the individual gage block members thereof, subjects the bar to an appreciable bending moment. This bending moment causes a lateral deflection Y, which deflection is greatest at the mid-point of the column length. Deflection Y naturally increases for increased loads F, longer gage block assembled lengths L, or larger eccentricities e between the center lines of the applied forces F. Accordingly, such deflection results in considerable loss of parallelism and dimensional change in the overall lengths of the gage block assemblies 30 or 35, introducing significant errors into measurements made with such tools. Further, since the assembled gage blocks are really separate members as shown in FIGURES 3A, 3B rather than a solid block as shown in FIGURE 4, such measurement errors are further compounded because the flexure strength of the joint at two adjacent block surfaces is an unknown quantity, and its ability to resist bending is very small when compared to that of a solid bar.

In addition to the above-discussed column theory, lateral deflection, considerable inaccuracy results from placing the overall gage block assembly under compressive forces. That is, the stress applied over the entire length of gage block surface will result in a compressive decrease in length, directly proportional to the applied stress and inversely proportional to the modulus of elasticity for the particular gage block material. That is, the deformation may be expressed as:

(2) $\qquad\qquad C = S/E$ wherein:

$C$ = the deformation per inch of gage block length;
$S$ = the applied stress given in p.s.i.; and
$E$ = the modulation of elasticity given in p.s.i.

Figure 5:
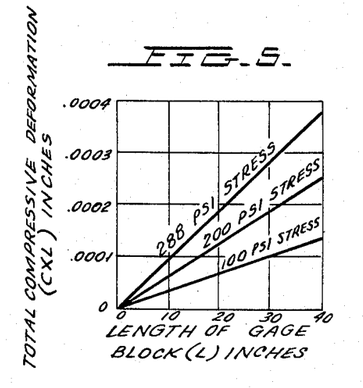
FIGURE 5 graphically shows the compressive of deformation of "Hoke" type gage blocks assembled in the manner of FIGURES 3A and 3B.

Considering steel gage blocks have a modulus of elasticity of $30 \times 10^6$, the total compressive deformation for three typical values of p.s.i. stress larger than the stress value necessary to rupture the intermediate air film gap and obtainable by conventional bolt fastening arrangements is graphically shown in FIGURE 5; it being emperically determined that in order to insure complete rupture of the air film the value of the compressive stress at the adjacent gage block surfaces should be at least in the order of about 100 p.s.i. The applied torque necessary to obtain such compressive stresses by fastening bolts may be determined using the formula:

(3) $\qquad\qquad T = KDSA$ where:

$T$ = the applied torque in inch pounds;
$K$ = the coefficient of bolt friction;
$A$ = the gage block area under compression;
$S$ = stress in p.s.i.; and
$D$ = the bolt diameter.

Hence, substituting this value in Equation 3, and considering a conventional quarter inch diameter bolt having a coefficient of bolt friction of 0.2 used in conjunction with a U.S. standard square gage block having a net mating surface area of 0.7 inch square, it is seen that only 3.5 inch pounds of torque is necessary for 100 p.s.i. of surface compressive stress, a value quite easily obtained with a conventional screw driver. This is, however, quite a low value, and it is quite probable that a higher value such as 7-inch pounds (corresponding to 200 p.s.i. stress) or 10-inch pounds (corresponding at 288 p.s.i. strength) will be used. Thus, by referring to FIGURE 5, it is seen that a 10" gage block assembled according to the frame holder or tie holder arrangement of FIGURES 3A or 3B, wherein the entire length thereof is under such compressive stress, will be shortened by 0.0001" corresponding to 10-inch pounds of applied torque; thus resulting in severe inaccuracy of measurement. Similarly, the hermaphrodite bolt arrangement of my above-mentioned U.S. Patent No. 2,766,531 is subjected to such inaccuracies, resulting from placing the entire length of gage block under compressive stress.

Reference is now made to FIGURES 6–9, which show one form of a gage block assembly 60 fastened in accordance with the preferred teachings of my invention. Assembly 60 is comprised of individual gage blocks 60–1 through 60–4 and "Hoke" block 65 to combinedly form the desired calibrating dimension. It will be noted that individual gage block members 60–1 through 60–4, although of different overall lengths, are similarly constructed at their fastened ends 67'. More specifically, referring to gage block 60–2, a central aperture 62 is provided, with aperture 62 being varied in dimension at one end thereof (shown as the lower end) to provide a shoulder 64 for the support of head 72 of fastening member 70. Fastener 70 has a lower threaded end 75 for fastening thereof, slotted end 73 for the reception of a controlled torque tightening tool, and pilot hole 77 for purposes to be subsequently discussed. The length T of gage block 60–2 intermediate head supporting shoulder 64 and bottom end surface 65 of the gage block is of a minimum dimension for proper structural strength (as for example in the order of 0.19") for all sizes of gage blocks constructed in accordance with my invention. Aperture 62 is varied at its other (upper) end, to provide a shouldered recess 66 for supporting threaded insert 80. Threaded insert 80 is externally threaded at 82 to mate with gage block threads 63 and internally threaded at 85 to mate with the threaded forward end 75 of fastening member 70. Accordingly, the compressive stresses within the gage block resulting from firm fastening of adjacent abutting surfaces 65, 67 thereof will be limited to the abutting regions of the gage blocks supporting fastening members 70, 80. Thus, by not placing the overall length of the gage block in compressive stress, as shown in above-discussed FIGURES 3A and 3B of typical prior art arrangements, I may provide substantial fastening stresses sufficient to rupture an intermediate air film therebetween and insure a clean, dry intimate engagement of such abutting surfaces 65, 67, without effecting considerable deformation of the overall gage block assembly and while preventing loss of parallelism resulting from column action.

Figures 6, 8, 8A, 9, 9A, 10:
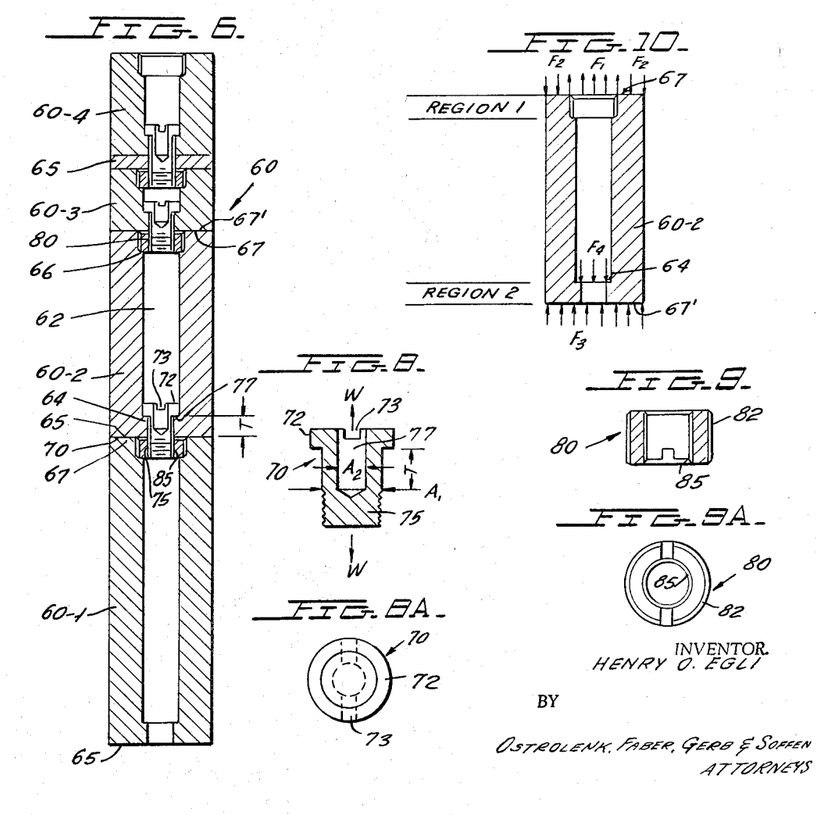
FIGURE 6 is a longitudinal cross-section in elevation of one form of a gage block assembly fastened in accordance with the principles of the instant invention.
FIGURES 8 and 8A are longitudinally cross-sectional and plan views respectively of one of the fastening members.
FIGURES 9 and 9A are longitudinal cross-sectional and plan views respectively of the other of the fastening members.
FIGURE 10 is a force diagram showing the manner in which the fastening arrangement of my invention advantageously limits compressive deformation.

Reference is now made to FIGURE 10, which shows a force diagram at surfaces 65, 67 of an intermediate gage block (such as 60–2) of the fastened assembly 60. At the upper region 1, corresponding to that adjacent surface 67 containing the threaded insert 80, the tensile forces F1 are substantially equal and opposite to the compressive forces F2, thereby effecting a net dimensional deformation at zero. Region 2, corresponding to lower surface 65 supporting the head 72 of fastening bolt 70, is under compressive stress of forces F3, F4 for relatively small length T, equal for all gage blocks (60–1, 60–2 . . .) regardless of length. Hence, the total compressive deformation of the entire gage block will be limited to that small region intermediate shoulder 64 and surface 65. Referring again to Equation 3 and considering a length T of $0.19 \times 10^{-6}$", this compressive variation is found to be approximately two-millionths of an inch per block, utilizing a ¼–32 NEF fastening bolt controllably subjected to 10-inch pounds of torque to provide 288 p.s.i. compressive stress; such stress being sufficient to firmly fasten the adjacent gage blocks and rupture an intermediate air film therebetween. Further, since all length gage blocks manufactured in accordance with my invention are subjected to the same compressive deviation under the application of such a controlled torque (provided by fastening of mating members 70, 80 with a conventional torque measuring tool), the two-millionths (or similar) compressive deviation may be compensated for in the original manufacture of individual blocks 60–1 through 60–4 by increasing the plus tolerance and reducing the minus tolerance by that value.

Figure 7:
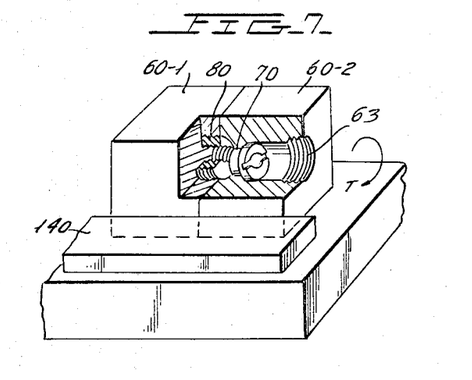
FIGURE 7 is a cut-away perspective view, more specifically showing the manner in which individual fastening members of FIGURE 6 cooperatively interconnect.

The above-described advantages of my invention are achieved in conjunction with an extremely simplified assembly operation. The blocks are first cleaned and dried, as by washing in a clean bath of naphtha, toluol, mineral spirits or other similar cleaning solvent to disolve any protective oils thereon drying the blocks; rubbing the blocks on a clean dry sheet of white sulphide bond paper positioned on a flat surface plate; and preferably brushing the mating gaging surfaces with a static cleaning brush to remove any lint or dust particles thereon. The adjacent gage blocks to be fastened, such as 60–1, 60–2, are edge-placed on straight edge 140, as shown in FIGURE 7, with the threaded insert 80 being already contained within the mating surface of gage block 60–1. The placement of 60–1, 60–2 on straight edge 140 insures parallelism of the individual gage blocks in both the vertical and horizontal directions. Fastening bolt 70 is then inserted in threaded engagement with the internal threads of insert 80, and the appropriate torque applied with a conventional torque measuring tool.

The simplified procedure of my invention is to be compared to the above-discussed wringing procedure of FIGURES 2A–2D, wherein the block surfaces are subjected to considerable bruising. By avoiding misalignment in the placing of the gage blocks together and sliding action with respect to adjacent gage blocks, I advantageously avoid such contact which has had a tendency to appreciably reduce the life of the gage blocks. Further, inasmuch as my gage blocks are not subjected to such hard handling, my arrangement makes it feasible to construct the gage blocks from a material having the same coefficient of thermal expansion as the work being measured, thereby eliminating errors resulting from differentials in temperature expansion therebetween.

In order to maintain a high degree of dimensional integrity at the overall gage block assembly 60, it is advantageous to compensate for temperature differentials from time of assembly to time of equalization. Although the degree of contraction or expansion effected by changes in temperature will be quite small compared to the prior art arrangements, the ultimate objectives of the instant arrangement of obtaining extremely accurate gage block assemblies is further enhanced by such temperature compensation. Such temperature compensation may be provided in the manner of FIGURE 11, by the addition of resilient washers 90, intermediate the recess 79 of fastening bolt 70 and internal shoulder 64 of the gage block assembly 60', as also shown in my aforementioned U.S. Patent No. 3,162,955, of which the instant case is a continuation-in-part. Washers 90 are formed of a resilient material, such as nylon, and their inclusion advantageously lessens the frictional engagement in tightening members 70, 80, thereby increasing torque determining accuracy.

Figure 11:
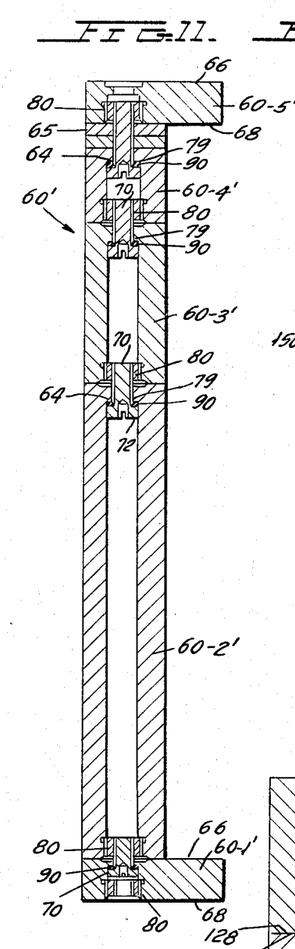
FIGURE 11 is a longitudinal cross-sectional view of a slightly modified arrangement assembled in accordance with the principles of my invention, showing the addition of a resilient washer.

It will be noted that the assembly 60' of FIGURE 11 shows a plurality of gage blocks 60–1' through 60'–5', constructed in the same manner as the gage blocks of assembly 60, together with one or more "Hoke" blocks 65 to provide the desired overall dimension. The end blocks 60–1', 60–5' include extending gaging surfaces 66, 68 at opposite surfaces thereof. It will be noted that members 60–1' and 60–5' are identically constructed and are interchangeable in assembly 60' so that both the upper and lower surfaces 66, 68 thereof may serve as gaging surfaces; with members 60–1', 60–5' being fastened to their adjacent engaged blocks in the same manner as the intermediate gage blocks 60–2'—60–4' of the assembly.

Alternatively, such temperature compensation may be provided by constructing the fastening member 70 itself to be sufficiently resilient to undergo dimensional variations, compensating for such temperature differences. Reference is made to FIGURE 8A with respect to a theoretical calculation of the differential temperature length change. Such dimensional change will be concentrated in the block and screw at the region T, which is not in threaded engagement. The relative length change in the block and screw region L is given by the formula:

$$(4) \qquad \Delta l = T \Delta t C$$

where:

T will be taken as .19"; and
C=the coefficient of thermal expansion taken at $6.5 \times 10^{-6}$" per degree Fahrenheit for steel.
$\Delta t$=temperature difference between gage block and fastener 70.

Figure 12:
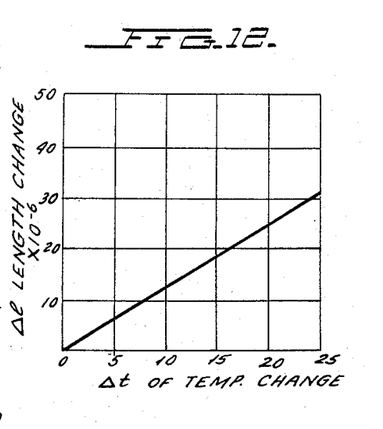
FIGURE 12 graphically shows the temperature differential length variation to which the fastening arrangement of FIGURES 6-10 is subjected.

Solving this equation yields:

$$(5) \qquad \Delta l = 1.23 \times 10^{-6} \Delta t$$

with a graphical representation thereof being indicated in FIGURE 12.

Referring to FIGURE 12, it is seen that a 10° Fahrenheit temperature change will be accompanied by a $12.3 \times 10^{-6}$" change at region T.

To determine the ability of fastener 70 to dimensionally compensate for this change without the addition of a resilient member such as washer 90 shown in FIGURE 11, the elongation of member 70 with respect to the applied load will now be computed. The tensile stress effected within fastening member 70 with respect to the applied load is given by the relationship equation:

$$(6) \qquad S_t = \frac{W}{A_1 - A_2}$$

where:

$S_t$=the tensile stress (p.s.i.);
$W$=applied load (pounds)
$A_1$=the nominal area of bolt 70; and
$A_2$=area of the pilot hole 77.

Considering a ¼–32 NEF bolt with ⅛" pilot hole, this equation reduces to:

$$(7) \qquad S_t = 27.8W$$

Considering now the elongation with respect to the tensile stress, this relationship is given by:

$$(8) \qquad \delta t = \frac{S_t T}{E}$$

where:

$\delta_t$=the total elongation;
$T$=length stressed (assumed to be 0.19"); and
$E$=modulus of elasticity ($30 \times 10^6$ for steel).

Substituting the value derived from Equation 7 in Equation 8 yields the result:

$$(9) \qquad \delta t = .176W \times 10^{-6}$$

Figure 13:
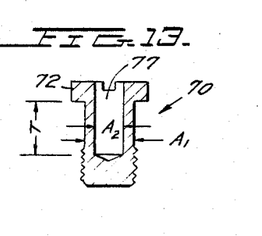
FIGURE 13 is a modification of the fastening member shown in FIGURE 8, to provide increased resilient compensation for temperature difference between fasteners and gage blocks at time of assembly.

Hence it is seen that for a 100 pound load, there will be an approximate 18 millionths inch elongation, this value being too low in comparison to the temperature change of Equation 5 to effectively compensate therefor. Thus, it is desirable to go to undercut threads and a larger pilot hole 77 to increase the strain of bolt 70. That is, by providing greater elongation per applied load the fastening member 70 will be more resiliently constructed to compensate for the temperature or otherwise induced dimensional stresses within the fastened members. Accordingly, fastening member 70 may undercut along region T, with pilot hole 77 being increased in diameter as shown in FIGURE 13. As for example undercutting region T to a 0.200 diameter will provide 45 millionths, 58 millionths and 79 millionths elongation, corresponding to diameters of pilot hole 77 of 0.15, 0.16 and 0.17" respectively. The torsional stresses developed in the thin wall surfaces of region T corresponding to such dimensional changes of bolt 70 may be safely carried without danger of rupture thereof.

Figure 15:
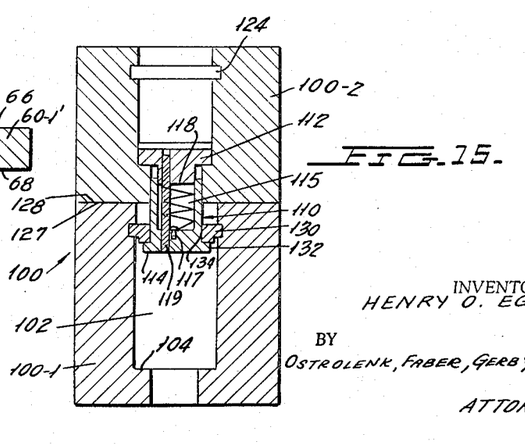
FIGURE 15 is a cross-sectional elevation view of a modified form of my invention.

Reference is made to FIGURE 15 which illustrates another embodiment of a gage block fastening assembly 100, constructed in accordance with the basic teachings of my invention, to provide increased dimensional integrity by controllably limiting the compressive stresses to the abutting regions of the adjacent gage block surfaces. Assembly 100 is shown comprising two gage blocks 100–1, 100–2, with it being understood that any number of gage blocks and "Hoke" blocks (not shown) may be fastened thereto in accordance with the particular overall dimensions desired. Each of gage blocks 100–1, 100–2 contains an internal aperture 102 narrowed at its lower end to provide a shoulder 104 (similar to shoulder 64) for supporting the head 112 of exanpdable fastening assembly 110. Expandable fastening assembly 110 includes a lower shoe portion 114 interconnected to upper head member 112 by biasing member 115, such as a compressive spring; the ends of spring 115 being either screwed to their respective members 112, 114 as shown by lower screw 117 or forcefully inserted therein as shown at region 118. Pin 119 key interconnects 114 to 112.

The mating upper surface of the adjacent gage block contains a recess 124 (corresponding in function to shouldered recess 66 of the embodiment shown in FIGURE 6) to support snap-ring assembly 130, the lower surface 132 of which is in cam contact engagement with the upper surface of shoe 114 such that relative rotation thereof will forceably separate biased compression spring 115 to effect firm engagement of gage blocks 100–1, 100–2 at opposed abutting surfaces 127, 128 thereof. A suitable indentation is provided to cam shoe member 114 in its extended position, thereby providing predetermined stretching and compressive stress at surfaces 127, 128 sufficient to rupture the air film therebetween and being of equal amount for all gage blocks of the overall assembly. Fastening ring 130 preferably has an oval-shape opening 134 of a sufficient size to permit insertion of shoe 114 therethrough, thereby permitting assembly without removal of the snap ring 130 for the next block. Advantageously, the controlled rotation of expandable fastening assembly 110 avoids the need for a torque wrench to insure predetermined equal compressive forces at all the fastened gage block surfaces.

Figure 14:
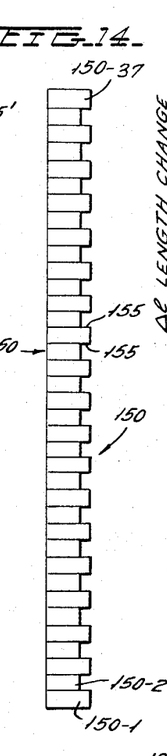
FIGURE 14 is an elevational view of a special type surface plate reference standard gage block assembly constructed of a large number of individual gage blocks fastened in accordance with my invention.

The extremes in accuracy obtainable as a result of my improved gage block fastening technique have been measured by assembling a special type gage bar 150 of the type shown in FIGURE 14, wherein 37 gage blocks 150–1 through 150–37, each of 0.500", are assembled in accordance with my invention. I have found that the overall accuracy between the end blocks 150–1, 150–37 agree with the nominal size of the solid gage block within ten-millionths of an inch. This accuracy is considerably better than the Federal specifications for class AA laboratory grade gage blocks, which allow an error of thirty-seven millionths of an inch for such an 18–½" long gage block assembly. Further, there is no detectable variation in parallelism in progressively checking along the length of the gage block. It will be noted that the areas of the gaging surfaces, such as 155, are kept small compared to the mating areas of the adjacent gage blocks, this further serving to maintain high dimensional integrity and keep the parallelism errors small.

In fastening gage block assemblies having known high-low deviations over the mating surfaces of individual gage block members thereof, I have obtained extremely close correspondence between the arithmetically computed and actually measured overall lengths. Further, in many instances the overall error has been found to be less than arithmetically determined, indicating the ability of my gage block fastening arrangement to provide acceptable averaging of such dimensional variations over the mating surfaces.

As a further advantageous aspect of my invention, the firm fastened engagement of the individual gage blocks permits the overall assembly to be submerged in a quenching tank to more rapidly bring the gage blocks to room temperature. That is, since the cooling effect of a quenching liquid such as kerosene or light protective oil maintained at room temperature is much more rapid than air cooling, the time needed for temperature stabilization is significantly reduced, with such time saving being especially beneficial in conjunction with long-assembled gage blocks. Submersion in a quenching tank also advantageously permits the establishment of a protective film at the gage block faces resulting from capillary action. That is, whereas a wrung assembly of gage blocks will be separated when submerged in a quenching tank, the thin layer of quenching liquid will form a protective film at the gage block surfaces fastened in accordance with my invention, with the dimensional variation resulting therefrom being unmeasurable. That is, extremely accurate measurement techniques have compared the measured value of a dry stack with respect to a submerged stack having such a film, with there being no discernable measured value. Accordingly, the provision of such a protective film at the gaging surfaces will provide ambient protection even when the exterior surfaces of the gage block assembly are exposed to a corrosive atmosphere.

Accordingly, it is seen that the fastening arrangement of my invention provides increased dimensional accuracy of gage-block assemblies, by controllably fastening the adjacent surfaces thereof with a predetermined torque, to provide a firm, clean and dry contact arrangement; with the compressive stresses being limited to the abutting regions of such adjacently fastened gage blocks. I further advantageously include temperature compensation to maintain such high dimensional integrity over ambient equalization extremes, with such a firm-fastened gage block assembly being adaptable for use in numerous types of gaging instruments.

Although in the foregoing specification, this invention has been described in conjunction with preferred embodiments, many variations and modifications will now become apparent to those skilled in the art, and I prefer, therefore, to be limited not by the specific disclosure herein contained but only by the appended claims.

The embodiments of the invention in which an exclusive privilege or property is claimed are defined as follows:

1. In a gage block assembly, a plurality of gage blocks having opposed end surfaces interconnected by longitudinally extending continuous wall surfaces to define an enclosed longitudinal volume; means for joining adjacent ones of said gage blocks at abutting end surfaces thereof; said means comprising: first and second members of relatively short length compared to the corresponding dimensions of said gage blocks; one of said adjacent gage blocks including means supporting said first member at the abutting end surface thereof, with the forward end of said first member projecting into the other of said adjacent gage blocks; said other of said adjacent gage blocks including means supporting said second member at the abutting end surface thereof; said forward end of said first member cooperatively engaging said second member to securably fasten said adjacent gage blocks while the abutting gage block end surfaces are stationarily located relative to each other, whereby compressive stresses effected by said cooperative engagement are limited to the abutting end regions of said gage blocks.

2. In a gage block assembly, a plurality of gage blocks; means for joining adjacent ones of said gage blocks at abutting surfaces thereof; said means comprising: first and second members of relatively short length compared to the corresponding dimensions of said gage blocks; one of said adjacent gage blocks including means supporting said first member at the abutting surface thereof, with the forward end of said first member projecting into the other of said adjacent gage blocks; said other of said adjacent gage blocks including means supporting said second member at the abutting surface thereof; said forward end of said first member cooperatively engaging said second member to securably fasten said adjacent gage blocks while the abutting gage block surfaces are stationarily located relative to each other, whereby compressive stresses effected by said cooperative engagement are limited to the abutting regions of said gage blocks, the cooperative engagement of said first and second members providing sufficient compressive stress at the abutting surfaces of said adjacent gage blocks to rupture an intermediate air film, whereby clean and dry contact engagement is effected at the abutting surfaces.

3. In a gage block assembly as set forth in claim 2, said compressive stress being a predetermined amount, at least in the order of 100 p.s.i.

4. In a gage block assembly, a plurality of gage blocks; means for joining adjacent ones of said gage blocks at abutting surfaces thereof; said means comprising: first and second members of relatively short length compared to the corresponding dimensions of said gage blocks; one of said adjacent gage blocks including means supporting said first member at the abutting surface thereof, with the forward end of said first member projecting into the other of said adjacent gage blocks; said other of said adjacent gage blocks including means supporting said second member at the abutting surface thereof; said forward end of said first member cooperatively engaging said second member to securably fasten said adjacent gage blocks while the abutting gage block surfaces are stationarily located relative to each other, whereby compressive stresses effected by said cooperative engagement are limited to the abutting regions of said gage blocks, said first member comprising a bolt, said means supporting said bolt comprising an internal shoulder abutted by the head of said bolt; said second member in threaded engagement with the forward end of said bolt; said second means being a threaded insert; the means supporting said threaded insert being an internal shoulder.

5. In a gage block assembly as set forth in claim 4, said bolt constructed to resiliently compensate for dimensional stresses.

6. In a gage block assembly as set forth in claim 4, a resilient washer disposed intermediate the head of said bolt, and said internal shoulder of said one gage block.

7. In a gage block assembly as set forth in claim 4, said bolt being undercut along the length thereof intermediate said shoulder abutting head and threadedly engaged forward end thereof, to resiliently compensate for dimensional stresses.

8. In a gage block assembly, a plurality of gage blocks; means for joining adjacent ones of said gage blocks at abutting surfaces thereof; said means comprising: first and second members of relatively short length compared to the corresponding dimensions of said gage blocks; one of said adjacent gage blocks including means supporting said first member at the abutting surface thereof, with the forward end of said first member projecting into the other of said adjacent gage blocks; said other of said adjacent gage blocks including means supporting said second member at the abutting surface thereof; said forward end of said first member cooperatively engaging said second member to securably fasten said adjacent gage blocks, whereby compressive stresses effected by said cooperative engagement are limited to the abutting regions of said gage blocks; said first member comprising a bolt; said means supporting said bolt comprising an internal shoulder abutted by the head of said bolt; said second member in threaded engagement with the forward end of said bolt; said second means being a threaded insert; the means supporting said threaded insert being an internal shoulder; the threaded engagement of said bolt and threaded insert providing sufficient compressive stress at the abutting surfaces of said adjacent gage blocks to rupture an intermediate air film, whereby clean and dry contact engagement is effected at the abutting surfaces; said compressive stress being a predetermined amount, at least in the order of 100 p.s.i.

9. In a gage block assembly, a plurality of gage blocks having opposed end surfaces interconnected by longitudinally extending continuous wall surfaces to define an enclosed longitudinal volume; means for joining adjacent ones of said gage blocks at abutting end surfaces thereof; said means comprising: first and second members of relatively short length compared to the corresponding dimensions of said gage blocks; one of said adjacent gage blocks including means supporting said first member at the abutting end surface thereof, with the forward end of said first member projecting into the other of said adjacent gage blocks; said other of said adjacent gage blocks including means supporting said second member at the abutting end surface thereof; said forward end of said first member cooperatively engaging said second member to securably fasten said adjacent gage blocks, whereby compressive stresses effected by said cooperative engagement are limited to the abutting end regions of said gage blocks; said first member comprising a bolt; said means supporting said bolt comprising an internal shoulder abutted by the head of said bolt; said second member in threaded engagement with the forward end of said bolt; said one gage block having a bore of sufficient width to slidably accommodate the head of said bolt; said bore shoulder terminating at said shoulder close to the end of said one gage block to limit the region of compressive stress of said bolt on said gage block.

10. In a gage block assembly, a plurality of gage blocks; means for joining adjacent ones of said gage blocks at abutting surfaces thereof; said means comprising: first and second members of relatively short length compared to the corresponding dimensions of said gage blocks; one of said adjacent gage blocks including means supporting said first member at the abutting surface thereof, with the forward end of said first member projecting into the other of said adjacent gage blocks; and other of said adjacent gage blocks including means supporting said second member at the abutting surface thereof; said forward end of siad first member cooperatively engaging said second member to securably fasten said adjacent gage blocks while the abutting gage block surfaces are stationarily located relative to each other, whereby compressive stresses effected by said cooperative engagement are limited to the abutting regions of said gage blocks, said first member comprising a force expandable assembly; said means for positioning said first member comprising an internal shoulder abutted by a broadened head of said expandable assembly; said second means having a cam surface engaging the forward end of said assembly, whereby cam actuated expansion of said first member compressively fastens said abutting surfaces; said compressive fastening providing sufficient compressive stress at the abutting surfaces of said adjacent gage blocks to rupture an intermediate air film, whereby clean and dry contact engagement is effected at the abutting surfaces.

11. In a gage block assembly as set forth in claim 10, said compressive stress being a predetermined amount, at least in the order of 100 p.s.i.

12. In a gage block assembly as set forth in claim 10, said first member comprising a force expandable assembly; said means for positioning said first member comprising an internal shoulder abutted by a broadened head of said expandable assembly; said second means having a cam surface engaging the forward end of said assembly, whereby cam actuated expansion of said first member compressively fastens said abutting surfaces; said expandable assembly including a spring interconnecting said broadened head and forward end portions thereof; the cam engagement of said forward end and cam surface predeterminedly stressing said spring to provide sufficient compressive stress at the abutting surfaces of said adjacent gage blocks to rupture an intermediate air film, whereby clean and dry contact engagement is effected at the abutting surfaces.

13. In a gage block assembly, a plurality of gage blocks including at least a first, second and third gage block; said gage blocks having opposed end surfaces interconnected by longitudinally extending continuous wall surfaces to define an enclosed longitudinal volume and being in end-to-end abutting relationship; fastening means for joining each of the abutting end surfaces of said gage blocks; said fastening means including cooperating first and second members; said first members being located at one end surface of said abutted gage blocks, and said second members being located at the other end surface of said abutted gage blocks; whereby the first member of said first gage block engages the second member of said second gage block, and the first member of said second gage block engages the second member of said third gage block; means supporting said first and second members at the end surfaces of their respective gage blocks such that said abutting gage block surfaces are stationarily located relative to each other during the forcible cooperative securement of said first and second members to each other, whereby compressive forces effected by fastening engagement thereof is limited to the abutting regions of the fastened gage blocks.

14. In a gage block assembly, a plurality of gage blocks including at least a first, second and third gage block; said gage blocks having opposed end surfaces interconnected by longitudinally extending continuous wall surfaces to define an enclosed longitudinal volume and being in end-to-end abutting relationship; fastening means for joining each of the abutting end surfaces of said gage blocks; said fastening means including cooperating first and second members; said first members being located at one end surface of said abutted gage blocks, and said second members being located at the other end surface of said abutted gage blocks; whereby the first member of said first gage block engages the second member of said second gage block, and the first member of said second gage block engages the second member of said third gage block; means supporting said first and second members at the end surfaces of their respective gage blocks such that said abutting gage block surfaces are stationarily located relative to each other during the forcible cooperative securement of said first and second members to each other, whereby compressive forces effected by fastening engagement thereof is limited to the abutting regions of the fastened gage blocks; at least one of said first, second or third gage blocks being of a different overall length than the other of said gage blocks; the fastening means of all of said gage blocks being identical, whereby substantially identical regions of all of said gage blocks are in compressive stress.

15. In a gage block assembly as set forth in claim 14, said first member comprising a bolt; said means supporting said bolt comprising an internal shoulder abutted by the head of said bolt; said second member in threaded engagement with the forward end of said bolt.

16. In a gage block assembly, a plurality of gage blocks including at least a first, second and third gage block; said gage blocks being in end-to-end abutting relationship; fastening means for joining each of the abutting surfaces of said gage blocks; said fastening means including cooperating first and second members; said first members being located at one end surface of said abutted gage blocks, and said second members being located at the other end surface of said abutted gage blocks; whereby the first member of said first gage block engages the second member of said second gage block, and the first member of said second gage block engages the second member of said third gage block; means supporting said first and second members at the end surfaces of their respective gage blocks such that said abutting gage block surfaces are stationarily located relative to each other during the forcible cooperative securement of said first and second members to each other, whereby compressive forces effected by fastening engagement thereof is limited to the abutting regions of the fastened gage blocks; at least one of said first, second or third gage blocks being of a different overall length than the other of said gage blocks; the fastening means of all of said gage blocks being identical, whereby substantially identical regions of all of said gage blocks are in compressive stress; said first member comprising a bolt; said means supporting said bolt comprising an internal shoulder abutted by the head of said bolt; said second member in threaded engagement with the forward end of said bolt; the cooperative engagement of said first and second members provides sufficient compressive stress at the abutting surfaces of said adjacent gage blocks to rupture an intermediate air film, whereby clean and dry contact engagement is effected at the abutting surfaces; said compressive stress being a predetermined amount, at least in the order of 100 p.s.i.

17. In a gage block assembly, a plurality of gage blocks including at least a first, second and third gage block; said gage blocks being in end-to-end abutting relationship; fastening means for joining each of the abutting surfaces of said gage blocks; said fastening means including cooperating first and second members; said first members being located at one end surface of said abutted gage blocks, and said second members being located at the other end surface of said abutted gage blocks; whereby the first member of said first gage block engages the second member of said second gage block, and the first member of said second gage block engages the second member of said third gage block; means supporting said first and second members at the end surfaces of their respective gage blocks, whereby compressive forces effected by fastening engagement thereof is limited to the abutting regions of the fastened gage blocks; at least one of said first, second or third gage blocks being of a different overall length than the other of said gage blocks; the fastening means of all of said gage blocks being identical, whereby substantially identical regions of all of said gage blocks are in compressive stress; said first member comprising a bolt; said means supporting said bolt comprising an internal shoulder abutted by the head of said bolt; said second member in threaded engagement with the forward end of said bolt; the cooperative engagement of said first and second members providing sufficient compressive stress at the abutting surfaces of said adjacent gage blocks to rupture an intermediate air film, whereby clean and dry contact engagement is effected at the abutting surfaces; said compressive stress being a predetermined amount at least in the order of 100 p.s.i.; the net deformation of one of the fastened ends being substantially zero, the net deformation of the other of said fastened ends being substantially equal for gage blocks of differing overall lengths, and in the order of up to 0.000002 inch.

18. A gage block comprising substantially parallel first and second end surfaces; longitudinally extending continuous wall surfaces interconnecting said first and second end surfaces to define a volume longitudinally coextensive; a central bore extending through said gage block intermediate said first and second end surfaces; the central bore including a narrowed section adjacent said first end surface to form an internal support shoulder, and an internally threaded widened section adjacent the second end surface, forming an internal shoulder, said internal support shoulder and said threaded section adopted to support fastening means for fastening the first end surface of said gage block to the second end surface of a similar gage block; the internal dimensions of said central bore including a first narrowed section, adjacent said first end surface to form a first internal support shoulder, and a second narrowed section adjacent said second end surface to form a second internal support shoulder, said first and second internal support shoulders adapted to support fastening means for fastening the first end surface of said gage block to the second end surface of a similar gage block; the length of gage block intermediate said internal support and their respective end surfaces being considerably less than the overall length of said gage block.

19. A gage block comprising substantially parallel first and second end surfaces; longitudinally extending continuous wall surfaces interconnecting said first and second end surfaces to define a volume longitudinally coextensive therebetween; a central bore extending through said gage block intermediate said first and second end surfaces; the internal dimensions of said central bore being varied adjacent said first and second end surfaces to form internal support regions adapted to support a fastening means; the length of gage block intermediate said internal support regions and their respective end surfaces being considerably less than the overall length of said gage block, the internal dimensions of said central bore being narrowed at said first end to form an internal support shoulder adapted to support a bolt head.

20. A gage block comprising substantially parallel first and second end surfaces; longitudinally extending continuous wall surfaces interconnecting said first and second end surfaces to define a volume longitudinally coextensive therebetween; a central bore extending through said gage block intermediate said first and second end surfaces; the internal dimensions of said central bore being varied adjacent said first and second end surfaces to form internal support regions adapted to support a fastening means; the length of gage block intermediate said internal support regions and their respective end surfaces being considerably less than the overall length of said gage block, the internal dimensions of said central bore being narrowed at said first end to form a first internal support shoulder adapted to support a bolt head, the central bore being enlarged at said second end, said enlarged section terminating at a reduced diameter section to form a second internal shoulder support adapted to support a threaded insert.

References Cited by the Examiner

UNITED STATES PATENTS

| | | | |
|---|---|---|---|
| 1,235,956 | 8/1917 | Berkebile | 33—208 |
| 1,514,525 | 11/1924 | Hoke | 33—168 |
| 1,661,944 | 3/1928 | Heinz | 33—165 |
| 2,214,177 | 9/1940 | Raybould | 287—127 |
| 3,135,536 | 6/1964 | Chilton | 285—187 |

LEONARD FORMAN, *Primary Examiner.*

ISAAC LISANN, W. K. QUARLES, *Assistant Examiners.*